Dec. 25, 1962  E. K. HEIL  3,069,740
FASTENING DEVICE
Filed April 21, 1959
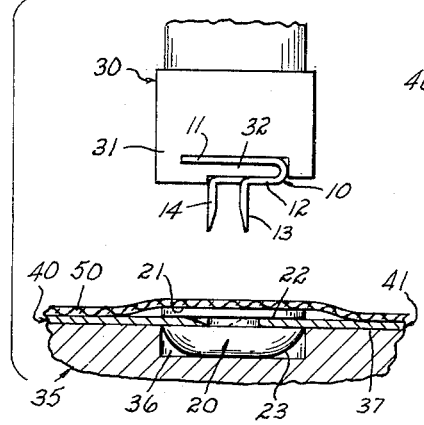
FIG. 1
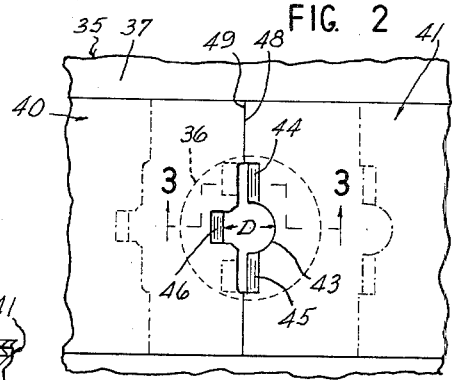
FIG. 2
FIG. 3
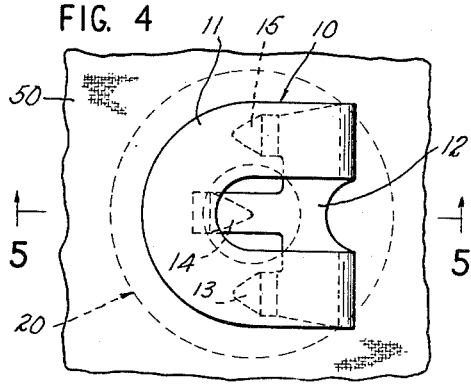
FIG. 4
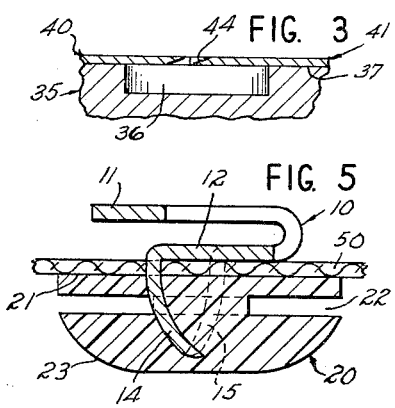
FIG. 5
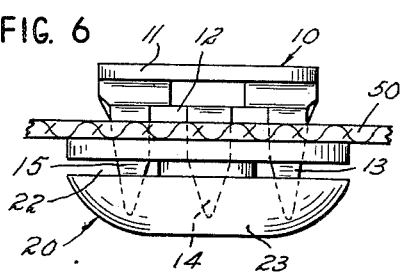
FIG. 6
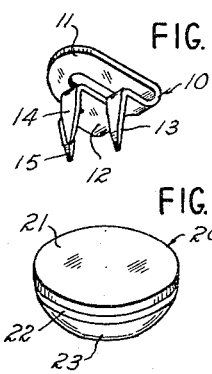
FIG. 7
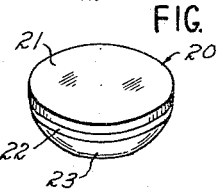
FIG. 8
INVENTOR
EDWARD K. HEIL
BY *Lindsey and Prutzman*
ATTORNEYS

1

3,069,740
FASTENING DEVICE
Edward K. Heil, Southington, Conn., assignor to North & Judd Manufacturing Company, New Britain, Conn., a corporation of Connecticut
Filed Apr. 21, 1959, Ser. No. 807,909
3 Claims. (Cl. 24—226)

This invention relates to an improved hook-type staple fastener for clothing and the like.

It is an object of this invention to provide a fastener for clothing and the like having improved appearance features permitting decorative use while, at the same time, providing a fastener having improved strength and durability.

It is a further object of this invention to provide an improved fastener that is easily applied to clothing and the like to produce a strong, economical, and reliable cloth-attached fastener.

Other objects will be in part obvious and in part pointed out more in detail hereinafter.

The invention accordingly consists in the features of construction, combination of elements and arrangement of parts which will be exemplified in the construction hereafter set forth and the scope of the application of which will be indicated in the appended claims.

In the drawings:

FIG. 1 is a partial side elevation view of the improved fastener and apparatus of this invention in position for assembly;

FIG. 2 is a partial top plan view of the table of the apparatus of this invention;

FIG. 3 is a partial cross section view taken along the lines 3—3 of FIG. 2;

FIG. 4 is a top plan view of a preferred embodiment of the improved fastener of this invention;

FIG. 5 is a partial cross section taken along the lines 5—5 of FIG. 4;

FIG. 6 is a partial end view showing the fastener in assembled position;

FIG. 7 is a perspective view of the hook portion of the staple fastener; and

FIG. 8 is a perspective view of the button retainer.

A better understanding of the fastener and apparatus of this invention can best be obtained by referring first to FIGS. 7 and 8 in which the component parts of a preferred embodiment of the hook type fastener of this invention are illustrated. The hook designated generally as 10 can be stamped from sheet metal and bent up to provide a flat tongue 11, a base 12 generally parallel to tongue 11 and a plurality of prongs 13, 14 and 15 (three in the preferred embodiment). Tongue 11 cooperates with a conventional "eye" type fastener, not shown. The prongs 13, 14 and 15 are provided with pointed or tapered ends to facilitate their insertion into a button 20 to form the completed hook fastener as hereinafter described. The relative positioning as well as the number of prongs which are bent up or otherwise provided on base 12, is a matter of choice. However, in the illustrated preferred embodiment, three equally-spaced depending prongs are provided on base 12.

Button 20 cooperates with hook 10 to complete the improved fastener and is provided with a flat upper surface 21 whose dimensions are somewhat greater than the spacing of prongs 13, 14 and 15 so that each prong can be inserted into flat side 21 of button 20 when hook 10 is properly aligned therewith. As most clearly seen in FIGS. 5, 6, and 8, button 20 is provided with a radial groove 22 slightly displaced from and parallel to flat surface 21. The depth of groove 22 is such that prongs 13, 14, and 15 pass laterally therethrough when hook 10 is assembled to button 20. Lower surface 23 of button

2

20 is illustrated as having a generally convex configuration and, since it is exposed to view when assembled on a garment, can be provided with any desired decorative appearance. Button 20 is made of a suitable plastic in the preferred embodiment so that the prongs can be easily inserted therein and a decorative appearance can be easily provided, such as by molding.

To best describe the manner in which hook 10 is secured to button 20, it is desirable to describe the apparatus of this invention usable to set hook 10 in button 20. Referring particularly to FIGS. 1–5, it is seen that a hammer 30 is provided having apropriate lateral grooves in its lower end 31 so as to slidably retain hook fastener 10 in position with its prongs extending downwardly and with base 12 of hook 10 backed-up by tongue 32 of hammer 30. An appropriate mechanism, not shown, is provided to reciprocate hammer 30 toward and away from table or anvil 35 which is fixed in position. Table 35 is provided with a depression or recessed portion 36 to retain button 20 in position relative to hammer 30 and hook 10 during the assembly operation. In the preferred embodiment, depression 36 is generally circular in horizontal cross section so as to restrain button 20 against lateral movement and is of such a depth so as to position the lower edge of groove 22 in line with upper surface 37 of table 35. Deflectors or anvils 40 and 41 are slidably positioned on upper surface 36 of table 35 for movement toward and away from button 20 and each other.

As most clearly seen in FIG. 2, the inner edge of anvil 41 is provided with a recessed semi-circular opening 43 whose diameter generally conforms to the inner diameter of groove 22. Beveled deflection edges 44 and 45 are provided adjacent opening 43 and extending outwardly therefrom in a position to engage prongs 13 and 15 when the fastener is assembled into the button.

Anvil 40 is longitudinally aligned with anvil 41 and is provided with a central beveled deflection section 46 centrally disposed relative to opening 43 of anvil 41 but longitudinally displaced therefrom so that distance "D" exceeds the internal diameter of groove 22 when edges 48 and 49 of anvils 41 and 40 are in abutting engagement. In addition, the edge of anvil 40 is relieved opposite deflection bevels 44 and 45 to define openings through which the prongs can slide.

To assemble fastener 10 and button 20 on a piece of cloth schematically designated 50, it is necessary to place a button 20 in depression 36 of table 35 after anvils 40 and 41 have been withdrawn to the dotted line position of FIG. 2. The anvils are then returned to the solid line position of FIG. 2, thereby fixedly positioning button 20 on table 35 with anvils 40 and 41 in groove 22 of button 20. The piece of cloth 50 is then positioned over flat surface 21 of button 20 and hammer 30 with hook 10 in position is brought down on table 35 with sufficient pressure to force prongs 13, 14, and 15 into button 20. As the prongs pass through button 20, each prong engages a beveled deflection edge causing prongs 13 and 15 to bend as shown in dotted lines of FIG. 5 and to cause prong 14 to bend towards prongs 13 and 15 as shown in the solid line of FIG. 5. Anvils 40 and 41 are then withdrawn from groove 22 and the fastener, properly assembled on cloth 50, is removed from the apparatus.

As is apparent from the drawings and particularly FIGS. 4, 5, and 6, at least the end portions of prongs 13, 14 and 15 are arcuately deformed within button 20 so as to provide exceptionally firm interlocking engagement between hook 10 and button 20. In addition, the assembled fastener is firmly secured to cloth 50, not only by the passage of prongs 13, 14 and 15 therethrough, but also by the pressure exerted between base 12 of hook 10 and flat surface 21 of button 20. The apparatus disclosed herein is not only economical to make and use but also enables hook 10 to be secured to button 20 without marring the surface of the button, since the force necessary to set the fastener is absorbed by anvils 40 and 41.

As will be apparent to persons skilled in the art, various modifications and adaptations of the structure above described will become readily apparent without departure from the spirit and scope of the invention, the scope of which is defined in the appended claims.

I claim:

1. A hook type staple fastener for garments or the like comprising a metal hook body having generally parallel tongue and base portions, a plurality of depending prongs on said base portion adapted to pierce the fabric of a garment, and a plastic button having an annular groove formed therein and having a flat face generally parallel to the side walls of said annular groove, said prongs passing through the fabric and being embedded in said plastic button so as to extend laterally through said annular groove, said prongs further having arcuately deformed ends thereby to effect interlocking engagement of the fastener with said plastic button.

2. A hook type staple fastener for garments or the like comprising a metal hook body having generally parallel tongue and base portions, a plurality of prongs depending from said base portion and adapted to pierce the fabric of a garment, and a plastic button dimensioned to cooperate with said hook and having a flat face formed thereon through which said prongs pass into the body of said plastic button, said plastic button further having an annular groove formed therein through which said prongs pass laterally thereof, said hook member and said button being fixedly positioned relative to each other by arcuate deformation of the ends of said prongs upon insertion into said button, the ends of said prongs being contained within said button.

3. A fastener for garments and the like comprising a metallic fastener having a base and a plurality of prongs depending therefrom, and a plastic button having an annular peripheral groove formed therein and having a flat face generally parallel to said annular groove, said prongs passing through the fabric of a garment having arcuately deformed ends embedded in said plastic button and passing laterally through said annular groove.

References Cited in the file of this patent

UNITED STATES PATENTS

| | | |
|---|---|---|
| 113,874 | Givaudan | Apr. 18, 1871 |
| 548,316 | Kempshall | Oct. 22, 1895 |
| 631,216 | Kindmann | Aug. 15, 1899 |
| 649,153 | Ashbaugh et al. | May 8, 1900 |
| 1,026,017 | Anderson | May 14, 1912 |
| 1,183,822 | Stanley et al. | May 16, 1916 |
| 1,752,418 | Clark et al. | Apr. 1, 1930 |
| 1,824,940 | White | Sept. 29, 1931 |
| 2,108,905 | Sheer | Feb. 22, 1938 |
| 2,310,008 | Wolff et al. | Feb. 2, 1943 |